United States Patent [19]

Hattori

[11] Patent Number: 4,884,997

[45] Date of Patent: Dec. 5, 1989

[54] V-PULLEY FOR BELT TYPE CONTINUOUSLY VARIABLE TRANSMISSION

[75] Inventor: Torao Hattori, Saitama, Japan

[73] Assignee: Honda Giken Kogyo Kabushiki Kaisha, Tokyo, Japan

[21] Appl. No.: 202,981

[22] Filed: Jun. 6, 1988

[30] Foreign Application Priority Data

Jun. 5, 1987 [JP] Japan .................. 62-86772[U]

[51] Int. Cl.⁴ ............................. F16H 11/02
[52] U.S. Cl. ........................ 474/28; 474/18
[58] Field of Search ............. 474/8, 11, 12, 17, 18, 474/28, 69, 70; 74/867–869

[56] References Cited

U.S. PATENT DOCUMENTS

| | | |
|---|---|---|
| 4,403,974 | 9/1983 | Sherman et al. .......... 474/28 X |
| 4,673,379 | 6/1987 | Ohzono et al. .......... 474/28 |
| 4,753,627 | 6/1988 | Kawamoto ............. 474/18 |

FOREIGN PATENT DOCUMENTS 0097359  6/1984  Japan ................. 474/28

Primary Examiner—Thuy M. Bui
Attorney, Agent, or Firm—Lyon & Lyon

[57] ABSTRACT

A V-pulley to be used in a belt type continuously variable transmission, which V-pulley comprises a stationary pulley half fixedly mounted to a transmission shaft and a movable pulley half coupled slidably to the shaft via a plurality of rows of ball keys and cooperating with the stationary half to support a V-belt. A plurality of coil springs resiliently biasing the movable half toward the stationary half too impart an initial tension to the V-belt. A hydraulic operating device includes a first hydraulic member fixedly mounted to the shaft and a second hydraulic member disposed on the movable pulley half to define a hydraulic chamber against the first member for operating the movable half by hydraulic pressure fed to the hydraulic chamber. A control valve for controlling the pressure supply to the device. A plurality of guide grooves are provided on the outer periphery of the shaft for guiding the rows of ball keys and the coil springs are disposed at positions between the guide grooves This serves to avoid interference of the springs with the ball keys and the hydraulic device.

10 Claims, 3 Drawing Sheets

V-PULLEY FOR BELT TYPE CONTINUOUSLY VARIABLE TRANSMISSION

BACKGROUND OF THE INVENTION

The present invention relates to a V-pulley for use with a belt type continuously variable transmission which is interposed in a power transmitting system of a vehicle such as a motorcycle, an automobile or the like and, more particularly, to a V-pulley for a belt type continuously variable transmission having a stationary pulley half, a movable pulley half, springs resiliently biasing the movable pulley half toward the stationary pulley half, a hydraulic operating device adapted to operate the movable pulley half, and a control valve for controlling supply of the hydraulic pressure to the hydraulic operating device.

V-pulleys of the mentioned type conventionally use a plurality of coil springs arranged radially outwardly of a plurality of rows of ball keys that couple the movable pulley to the transmission shaft with a view to shortening the axial length of the pulley (see U.S. Pat. No 4,560,369). However, in this type of pulley, the coil springs present an obstacle to any increase in pressure receiving area of the hydraulic operating device.

In addition, in conventional pulleys, the coil springs are disposed in a compressed state between the first hydraulic member fixedly mounted to the transmission shaft and the movable pulley half slidable on the transmission shaft so that at the time of assembly it is required to take the steps of fitting and fixing the first hydraulic member onto the transmission shaft while compressing the coil springs. These assembling steps necessitate the use of a special jig and skilled labor.

SUMMARY OF THE INVENTION

The present invention has been proposed in view of the above circumstances and its first object is to provide a V-pulley for a belt type continuously variable transmission which has a short axial length like conventional pulleys and sufficient hydraulic pressure receiving area in the hydraulically operating device without interference by the coil springs. A second object is to provide a V-pulley for a belt type continuously variable transmission wherein the first hydraulic member can be assembled without a resisting force from the coil springs thus improving the ability to assemble the pulley.

The above objects are achieved by the present invention by providing a plurality of guide grooves on the outer periphery of the transmission shaft for guiding the plurality of rows of ball keys and locating the coil springs between the plurality of guide grooves.

The present invention will now be described by way of an embodiment thereof with reference to the accompanying drawings.

DESCRIPTION OF THE PREFERRED EMBODIMENT

Figure 1:
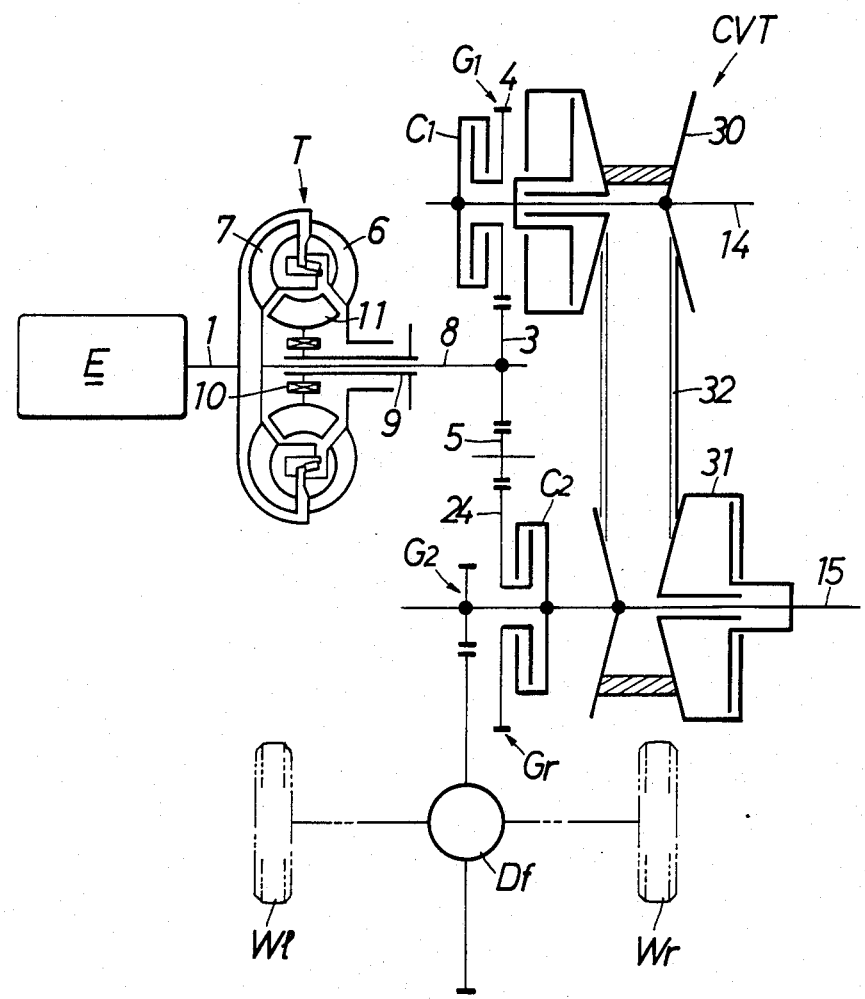
FIG. 1 is a diagrammatic view of a power transmitting system of an automobile.

Referring first to FIG. 1, a crankshaft 1 of an engine E is connected to a torque converter T, which in turn is connected to a primary reduction gear train G1, a first clutch C1, a belt-type continuously variable transmission CVT, a secondary reduction gear train G2 and a differential gear Df in that order. Left and right driving wheels W1 and Wr of an automobile are connected to a pair of output shafts of the differential gear Df.

A reverse gear train Gr and a second clutch C2 are interposed in parallel to the first clutch C1 and the continuously variable transmission CVT between the torque converter T and the secondary reduction gear train G2. The primary reduction gear train G1 and the reverse gear train Gr have a common drive gear 3, and the reverse gear train Gr has an idle gear 5 midway therein. These components are accommodated in a transmission case 2 (see FIG. 2) connected to the crankcase (not shown) of the engine E.

If the second clutch C2 is turned off (disengaged) and the first clutch C1 is turned on (engaged), the power from the engine E is transmitted successively through the torque converter T, the primary reduction gear train G1, the first clutch C1, the continuously variable transmission CVT, the secondary reduction gear train G2 and the differential gear Df to the driving wheels W1 and Wr to drive these wheels in a forward direction. On the other hand, if the first clutch C1 is turned off (disengaged) and the second clutch C2 is turned on (engaged), the power from the engine E is transmitted successively through the torque converter T, the reverse gear train Gr, the secondary reduction gear train G2 and the differential gear Df to the driving wheels W1 and Wr to drive them in a reverse direction.

The torque converter T is comprised of a pump impeller 6 connected to the crankshaft 1, a turbine impeller 7 connected to a turbine shaft 87, a stator impeller 11 connected through an unidirectional clutch 10 to a stationary stator shaft 9 which is relatively rotatably carried on the turbine shaft 8. The torque transmitted from the crankshaft 1 to the pump impeller 6 is hydraulically transmitted to the turbine impeller 7, and if amplification of the torque is effected during this time, the stator impeller 11 bears a reaction force thereof as is well known.

The drive gear 3 of the primary reduction gear train G1 is coupled to the turbine shaft 8, and a driven gear 4 of the primary reduction gear train G1 is rotatably carried on an input shaft 14 of the continuously variable transmission CVT.

The continuously variable transmission CVT includes, as its principle elements, a drive V-pulley 30 disposed adjacent the right side of the first clutch C1, a driven or follower V-pulley 31 disposed adjacent the right side of the second clutch C2, and a V-belt 32 stretched around the V-pulleys 30 and 31.

The above elements will be described in detail with reference to FIG. 2. The drive V-pulley 30 is comprised of a stationary pulley half 33 fixedly mounted on the input shaft 14 (actually shown as an integral component but may be separate), and a movable pulley half 34 slidably connected to the input shaft 14 with ball keys 35 interposed therebetween. The movable pulley half 34 has a hydraulic cylinder 36 integrally provided on the back thereof. A stationary piston 38 is received in the hydraulic cylinder 36 an fixedly mounted on the input shaft 14 to define a hydraulic chamber 37. Thus, if hydraulic pressure is introduced into the hydraulic chamber 37, the hydraulic cylinder 36 and thus the movable pulley half 34 can be moved rightward under the hydraulic pressure toward the stationary pulley half 33 to increase the effective radius of the drive V-pulley 30, i.e., radius of contact with the V-belt 32. On the the other hand, if the hydraulic pressure in the hydraulic chamber 37 is released, the movable pulley half 34 can be moved leftward away from the stationary pulley half 33 by the tension of the V-belt 32 to decrease the effective radius of the drive V-pulley 30. For such operation of the movable pulley half 34 by the hydraulic pressure, a first control valve $39_1$ is provided within the input shaft 14 and the details thereof will be described hereinafter.

An end plate 40 is secured to an opened end of the hydraulic cylinder 36 and slidably supported around an outer periphery of a boss portion 38a of the stationary piston 38, thereby providing support stability for the movable pulley half 34. A bleed groove 41 is cut in a slide surface of the end plate 40 against the boss portion 38a to permit communication between the interior and exterior of the end plate 40.

The following or driven V-pulley 31 is comprised of a stationary pulley half 43 integrally formed on the output shaft 15 and a movable pulley half 44 slidably connected to the output shaft 15 with ball keys 45 interposed therebetween. The stationary pulley half 43 is interposed therebetween. The stationary pulley half 43 is disposed in a relationship of point symmetry with the stationary pulley half 33 of the drive V-pulley 30, while the movable pulley half 44 is disposed in a relationship of point symmetry with the movable pulley half 34.

Figure 3:
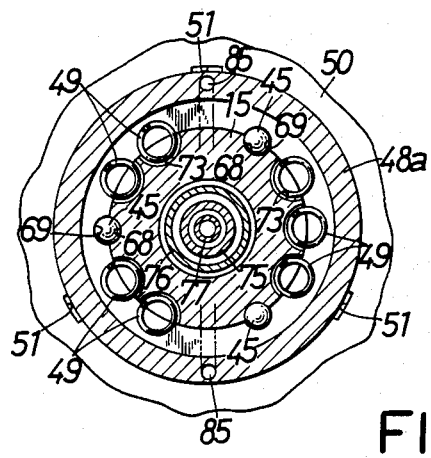
FIGS. 3, 4 and 5, are sectional views taken along the lines III—III, IV—IV, and V—V of FIG. 2, respectively.

The ball keys 45 are arranged in a plurality of rows by inserting some ball keys into each of a plurality of spaces defined between a plurality of key grooves 68 and 69 which are formed in opposed relation at regular circumferential intervals on sliding surfaces of the output shaft 15 and the movable pulley half 44, respectively (see FIG. 3).

The movable pulley half 44 includes a hydraulic cylinder 46 integrally provided on the back thereof and a stationary piston 48 is accommodated in the hydraulic cylinder 46 to define a hydraulic chamber 47. The stationary piston 48 includes a boss portion 48a which is fitted onto the outer periphery of the output shaft 15 and is rotatably supported on the transmission case 2 via a ball bearing 70. The boss portion 48a is fixedly mounted to the output shaft 15 by a pin 71 which is press-fitted into these components from radially outside. In order to prevent the pin 71 from fall out, the ball bearing 70 is arranged to have an inner race 70a with its inner peripheral surface facing the outer end of the pin 71. Coil springs 49 are mounted in a compressed manner between the output shaft 15 and the movable pulley half 44 for resiliently biasing this half 44 toward the stationary pulley half 43, so that the resilient force of the coil springs 49 imparts an initial tension to the V-belt 32.

Thus, if hydraulic pressure is introduced into the hydraulic chamber 47, the hydraulic cylinder 46 and thus the movable pulley half 44 can be moved leftward toward the stationary pulley half 43 to increase the effective radius of the driven V-pulley 31. On the other hand, if the hydraulic pressure within the hydraulic chamber 47 is released, the movable pulley half 44 can be moved rightward away from the stationary pulley half 43 by the tension of the V-belt 32 to decrease the effective radius of the driven V-pulley 31. For such operation of the movable pulley half 44 by the hydraulic pressure, a second control valve $39_2$ is provided within the output shaft 15 and the details thereof will be described hereinafter.

An end plate 50 is secured to an opened end of the hydraulic cylinder 46 and slidably supported around an outer periphery of the boss portion 48a of the stationary piston 48, thereby providing support stability for the movable pulley half 44. A bleed groove 51 is cut in a slide surface of the end plate 50 against the boss portion 48a to permit communication between the interior and exterior of the end plate 50.

Figure 4:
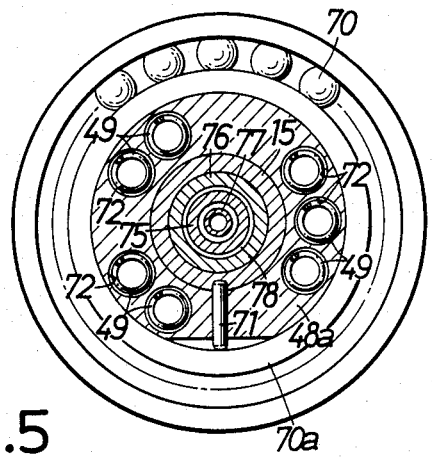

The boss portion 48a of stationary piston 48 is provided with a plurality of spring guide bores 72 penetrating axially therethrough and the output shaft 15 is provided with a plurality of spring guide groves 73 aligned with the respective bores 72. Each of the afore-mentioned plurality of coil springs 49 extends the length of a combined spring guide bore 72 and groove 73. The spring guide bores 72 and grooves 73 are circumferentially spaced and located on the outer periphery of the output shaft 15 at positions so as to place the coil springs 49 between the plurality of circumferentially spaced key grooves 68 (see FIGS. 3 and 4). This arrangement serves to prevent mutual interference between the key grooves 68 and coil springs 49 and to allow the driven V-pulley 31 to be of a reduced axial length even if the key grooves 68 and coil springs 49 are of substantial lengths.

Moreover, placing the coil springs 49 within the boss portion 48a of stationary piston 48 assures a sufficient pressure receiving area for the piston 48 exposed to the hydraulic chamber 47.

On the outer end of the boss portion 48a is superposed an annular pressing plate 74 which supports the fixed ends of the coil springs 49 and imparts a predetermined compressing load thereto. A washer based nut 88 is screwed and tightened to the right end of the output shaft 15 to fix the pressing plate 74 in place. The nut 88 has a further function of co-operating with an annular shoulder 89 of the boss portion 48a to clamp the inner race 70a of the ball bearing 70 therebetween.

Figure 5:
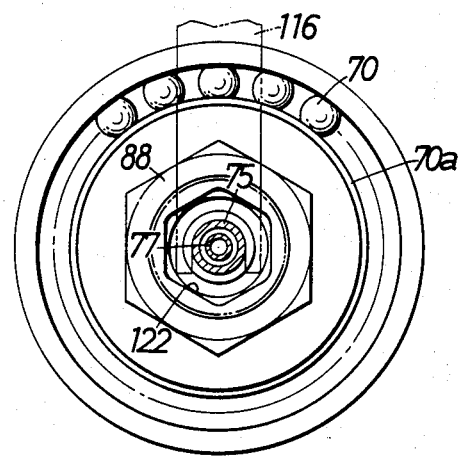

When assembling the driven V-pulley 31, the movable pulley half 44 and the stationary piston 48 are first fitted onto the output shaft 15 in that order and then the boss portion 48a of the stationary piston 48 is fixed to the output shaft 15 by driving the pin 71 into these members. Next the end plate 50 is mounted to the hydraulic cylinder 46, the ball bearing 70 is placed on the boss portion 48a and thereafter the coil springs 49 are inserted into respective spring guide bores 72. Then the pressing plate 74 is fitted around the output shaft 15 while urging the plate 74 against the coil springs 49, and the nut 88 is screwed and tightened to the shaft 15. During this assembly, the output shaft 15 is held in its position by inserting a detent tool into a socket hole 122 of a polygonal shape formed at the right end of the output shaft 15 (see FIG. 5).

The fact that the stationary piston 48 can be mounted to the output shaft 15 prior to mounting of the coil springs 49 which are used for resiliently biasing the movable pulley half 44 permits the stationary piston 48 to be fitted smoothly to the output shaft 15 and hydraulic cylinder 46 without being disturbed by the force of coil springs 49. This provides a remarkable improvement in the ease and accuracy of assembling the driven V-pulley 31.

Now, the first and second control valves 39₁ and 39₂ and a hydraulic servo motor 52 for driving them will be described with reference to FIG. 2 again.

The first control valve 39₁ comprises a cylindrical follower valve spool 56 slidably fitted in a hollow portion of the input shaft 14, and a cylindrical main valve spool 55 slidably fitted in the follower valve spool 56. A hydraulic oil inlet pipe 57 connected to a hydraulic pressure source (not shown) is inserted in the main valve spool 55. The hydraulic oil inlet pipe 57 is fixed at its base end to the transmission case 2. A cylindrical oil passage 58 is defined between the main valve spool 55 and the hydraulic oil inlet pipe 57 to communicate with the interior of the hydraulic oil inlet pipe 57.

The main valve spool 55 includes, around its outer periphery, an annular oil feed groove 59 and an annular oil discharge groove 60 axially spaced from the oil feed groove 59 toward the stationary pulley half 33. The oil feed groove 59 communicates with the cylindrical oil passage 58 by way of a through hole 61, while the oil discharge groove 60 is opened to the exterior of the main valve spool 55 through an axial groove 62.

The follower valve spool 56 includes an annular oil passage 63 on its outer peripheral surface, and a control port 64 adapted to permit the alternate communication of the annular oil passage 63 with the oil feed groove 59 and the oil discharge groove 60. The annular oil passage 63 is connected to the hydraulic chamber 37 via a through hole 65. Further, the follower valve spool 56 is connected to the movable pulley half 34 through a connecting pin 67 penetrating an elongated hole 66 extending in the axial direction of the input shaft 14 and the spool 56 axially reciprocates together with the movable pulley half 34.

Figure 2:
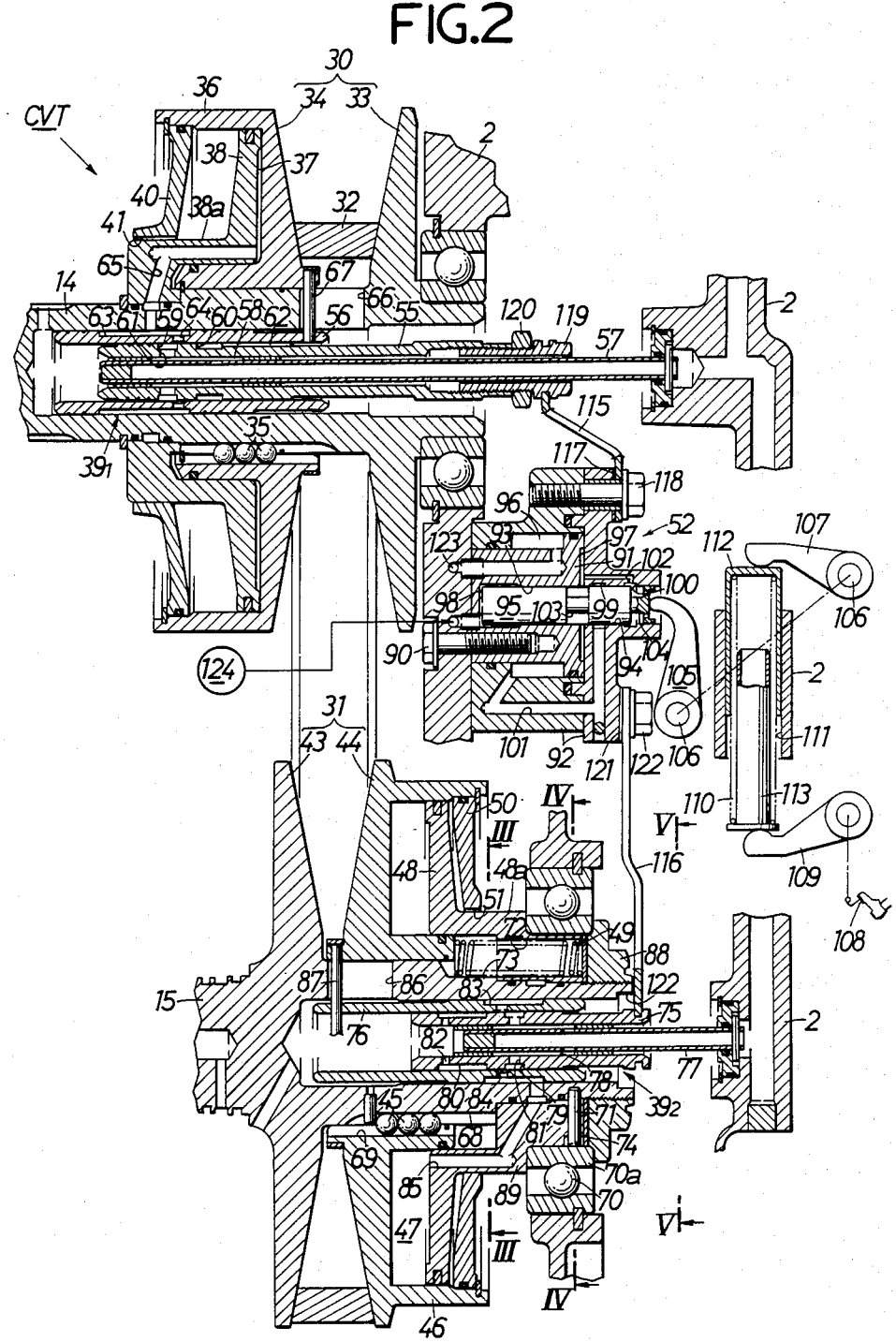
FIG. 2 is an enlarged vertical sectional view of a belt type continuously variable transmission incorporating the present invention in the power transmitting system.

Thus, if the main valve spool 55 is moved rightward as viewed in FIG. 2, the oil feed groove 59 is brought into communication with the control port 64, so that hydraulic oil pressure is supplied through the hydraulic oil inlet pipe 57 to the hydraulic chamber 37, and the movable pulley half 34 is moved rightward with the follower valve spool 56 under such hydraulic pressure. This rightward movement of the follower valve spool 56 causes the control port 64 to be closed by the main valve spool 55 and, as a result, the supply of hydraulic pressure into the hydraulic chamber 37 is cut off and thus the rightward movement of the movable pulley half 34 is stopped. On the contrary, if the main valve spool 55 is moved leftward, the oil discharge groove 60 is brought into communication with the control port 64, so that the hydraulic pressure in the hydraulic chamber 37 is released through the axial groove 62 to permit the leftward movement of the movable pulley half 34. Then if the movable pulley half 34 is moved leftward, the valve spool 56 is also moved leftward together with the movable pulley half 34. When the control port 64 is thus closed by the main valve spool 55, the discharge of oil from the hydraulic oil chamber 37 is blocked to stop the leftward movement of the movable pulley half 34. In this way, the movable pulley half 34 is operated to move with the follower valve spool 56 in a manner to follow the movement of the main valve spool 55.

The second control valve 39₂ comprises a cylindrical follower valve spool 76 slidably fitted in a hollow portion of the output shaft 15, and a cylindrical main valve spool 75 slidably fitted in the follower valve spool 76. A hydraulic oil inlet pipe 77 is connected to a hydraulic pressure source like the inlet pipe 57 and is inserted in the main valve spool 75. The hydraulic oil inlet pipe 77 is fixed at its base end to the transmission case 2. A cylindrical oil passage 78 is defined between the main valve spool 75 and the hydraulic oil inlet pipe 77 to communicate with the interior of the hydraulic oil inlet pipe 77.

The main valve spool 75 includes, around its outer periphery, an annular oil feed groove 79 and an annular oil discharge groove 80 axially spaced from the oil feed groove 79 toward the stationary pulley half 43. The oil feed groove 79 communicates with the cylindrical oil passage 78 by way of a through hole 81, while the oil discharge groove 80 is opened to the exterior of the main valve spool 75 through a discharge hole 82.

The follower valve spool 76 includes an annular oil passage 83 on its outer peripheral surface and a control port 84 adapted to permit the alternate communication of the annular oil passage 83 with the oil feed groove 79 and the oil discharge groove 80. The annular oil passage 83 is connected to the hydraulic oil chamber 47 via a through hole 85. Further, the follower valve spool 76 is connected to the movable pulley half 44 through a connecting pin 87 penetrating an elongated hole 86 extending in the axial direction of the output shaft 15 and the spool 76 axially reciprocates together with the movable pulley half 44.

Thus, if the main valve spool 75 is moved rightward as viewed in FIG. 2, the oil discharge groove 80 is brought into communication with the control port 84, so that hydraulic oil pressure in the hydraulic oil chamber 47 is released through the discharge hole 82 to permit the rightward movement of the movable pulley half 44. Then, if the movable pulley half 44 is moved rightward, the follower valve spool 76 is also moved rightward and with this movement, the control port 84 is closed by the main valve spool 75. This causes the discharge of oil from the hydraulic oil chamber 47 to be discontinued, thus stopping the rightward movement of the movable pulley half 44. On the contrary, if the main valve spool 75 is moved leftward, the oil feed groove 79 is brought into communication with the control port 84, permitting hydraulic pressure to be supplied into the hydraulic oil chamber 47, so that the movable pulley half 44 is moved leftward with the follower valve spool 76 under such hydraulic pressure. This causes the control port 84 to be closed by the main valve spool 75, cutting of the supply of hydraulic pressure into the hydraulic oil chamber 47 to stop the leftward movement of the movable pulley half 44. In this way, the movable pulley half 44 is operated to move with the follower valve spool 76 in a manner to follow the movement of the main valve spool 75.

The servo motor 52 comprises a piston 91 disposed in parallel to the input and output shafts 14 and 15 and secured to the transmission case 2 by a bolt 90, a power cylinder 92 slidably supported on the piston 91, and a pilot valve 95 slidably fitted in valve bores 93 and 94 in central portions of the piston 91 and the power cylinder 92, respectively.

The interior of the power cylinder 92 is divided by the piston 91 into a lefthand first actuating chamber 96 and a righthand second actuating chamber 97, with the pressure receiving area of the second actuating chamber 97 being larger than that of the first actuating chamber 96. The first actuating chamber 96 communicates with a hydraulic pressure source (not shown) via na oil passage 123, while the second actuating chamber 97 is connected to both of the valve bores 93 an 94. A hydraulic control oil chamber 98 is defined in the valve bore 93 by a left end face of the pilot valve 95, so that a hydraulic oil pressure proportional to vehicle speed may be supplied to the hydraulic control oil chamber 98 from a vehicle speed responsive type hydraulic governor 124.

An inner wall of the valve bore 94 in the power cylinder 92 is provided with an annular oil feed groove 99 an annular oil discharge groove 100 occupying a position to the right thereof. The oil feed groove 99 communicates with the first actuating chamber 96 via a through hole 101, while the oil discharge groove 100 communicates with the second actuating chamber 97 via a through hole 102.

The pilot valve 95 includes, around its outer periphery, a first annular control groove 103 adapted to provide the connection and disconnection between the second actuating chamber 97 and the oil feed groove 99, and a second annular control groove 104 adapted to open and close the oil discharge groove 100. The second control groove 103 is opened to the outside of the pilot valve 95.

A swinging end of a control lever 105 bears against a right end face of the pilot valve 95 to urge it toward the hydraulic control oil chamber 98. The control lever 105 is connected to a pressure receiving lever 107 through a pivot 106 supported on the transmission case 2, and a coil spring 110 is interposed between the pressure receiving lever 107 and a pressing lever 109 operatively connected to an accelerator pedal 108 which is operated to open and close a throttle valve (not shown) of the engine E, so that the compression load of the coil spring 110 may be increased in proportion to the depression of the pedal 108, i.e., an increase in opening degree of the throttle valve.

The coil spring 110 is connected at its one end to a leading end of the pressure receiving lever 107 through an outer tube 112 slidable in a guide hole 111 of the transmission case 2 and at the other end to the pressing lever 109 through an inner tube 113 slidable within the outer tube 112, and the outer tube 112 and inner tube 113 prevent the coil spring 110 from buckling.

In this manner, a rightward control force proportional to the vehicle speed is applied to the pilot valve 95 from the hydraulic control oil chamber 98, and a leftward control force proportional to the opening degree of the throttle valve of the engine E is applied to the pilot valve 95 from the control lever 105 so that the pilot valve 95 may be operated leftward or rightward depending upon the superiority and inferiority between these control forces.

Thus, if the pilot valve 95 is moved rightward, the oil discharge groove 100 is closed, and the second actuating chamber 97 and the oil feed groove 99 are brought into communication with each other, so that the hydraulic pressure in the oil passage 123 is also supplied into the second actuating chamber 97 as well as into the first actuating chamber 96, whereby the power cylinder 92 is moved rightward with a force provided by multiplication of the difference between the pressure receiving areas of the actuating chambers 96 and 97 by such hydraulic pressure. With the oil discharge groove 100 closed, if the oil feed groove 99 is also closed with this rightward movement, the supply of hydraulic pressure into the second actuating chamber 97 is cut off to stop the rightward movement of the power cylinder 92. Then, if the pilot valve 95 is moved leftward, the oil discharge groove 100 is opened to permit the hydraulic pressure in the second actuating chamber 97 to be released through the second control groove 104, so that the power cylinder 92 is moved leftward by the hydraulic pressure in the first actuating chamber 96 and with this leftward movement, the oil discharge groove 100 is closed to stop the leftward movement of the power cylinder 92. In this way, the power cylinder 92 is power-operated in a manner to follow the leftward and rightward movement of the pilot valve 95.

The main valve spools 56 and 75 of the first and second control valves $39_1$ and $39_2$ are connected to the power cylinder 92 through first and second interlocking plates 115 and 116, respectively. More specifically, the first interlocking plate 115 is connected at its one end to the right end face of the power cylinder 92 by a bolt 118 with a shim 117 sandwiched therebetween, and at the other end thereof to an adjusting bolt 119 threadedly connected to an outer end of the main valve spool 55. The adjusted position of the adjusting bolt 119 is fixed by a lock nut 120. The second interlocking plate 116 is connected at this one end to the right end face of the power cylinder 92 by a bolt 122 with a shim 121 sandwiched therebetween, and at the other end thereof to the outer end of main valve spool 75.

Accordingly, the operation of the power cylinder 92 makes it possible to simultaneously drive both main valve spools 55 and 75 through the interlocking plates 115 and 116. As a result, the relative position of the main valve spools 55 and 75, namely, the timing for opening and closing the respective control ports 64 and 84 in the control valve $39_1$ and $39_2$ is established in the following manner by selection of the width of the shims 117 and 121 and by adjustment of the threadedly connected position of the adjusting bolt 119.

(a) In the rightward movement of the power cylinder 92, the control port 84 in the second control valve $39_2$ is first closed, while the control port 64 in the first control valve $39_1$ is put into communication with the oil feed groove 59. Then, in a condition with the control port 64 and the oil feed groove 59 in communication with each other, the control port 84 in the second control valve $39_2$ is brought into communication with the oil discharge groove 80. By doing so, a tension can be applied to the V-belt 32 at the initial stage of the rightward movement of the power cylinder 92 by a rightward moving force of the movable pulley half 34 provided by the hydraulic pressure supplied through the oil feed groove 59 into the hydraulic oil chamber 37 in the drive V-pulley 30. Then, both pulley halves 34 and 44 can be moved rightward while maintaining such tension, as the oil is forced out of the hydraulic oil chamber 47 in the driven V-pulley 31 into the oil discharge groove 80.

(b) In the leftward movement of the power cylinder 92, the control port 84 in the second control valve $39_2$ is first closed and then, the control port 64 in the first control valve $39_1$ is closed, while the control port 84 in the second control valve $39_2$ is put into communication with the oil feed groove 79. Thereafter, in a condition with the control port 84 and the oil feed groove 79 in communication with each other, the control port 64 in the first control valve $39_1$ is brought into communication with the oil discharge groove 60. By doing so, a tension can be applied to the V-belt 32 during leftward movement of the power cylinder 92 by a leftward moving force of the movable pulley half 44 provided by the hydraulic pressure supplied through the oil feed groove 79 into the hydraulic oil chamber 47 in the driven V-pulley 31. Then, both pulley halves 34 and 44 can be moved leftward while maintaining such tension, as the oil is forced out of the hydraulic oil chamber 37 in the drive V-pulley 30 into the oil discharge groove 60.

With the rightward control force larger than the leftward control force to the pilot valve 95, the latter is moved rightward to move the power cylinder 92, thereby operating the first and second control vales $39_1$ and $39_2$ to move both movable pulley halves 34 and 44 rightward, thus decreasing the speed change ratio (reduction ratio) between the V-pulleys 30 and 31. On the other hand, with the leftward control force larger than the rightward control force, the pilot valve 95 is moved leftward to move the power cylinder 92 leftward, thereby operating both control valves $39_1$ and $39_2$ to move the movable pulley halves 34 and 44 leftward, thus increasing the speed change ratio.

What is claimed:

1. A V-pulley for a belt type continuously variable transmission, comprising a stationary pulley half fixedly mounted to a transmission shaft; a movable pulley half coupled slidably to the transmission shaft via a plurality of rows of ball keys and cooperating with the stationary pulley half to support a V-belt; a plurality of coil springs resiliently biasing the movable pulley half toward the stationary pulley half to impart an initial tension to the V-belt; a hydraulic operating device including a first hydraulic member fixedly mounted to the transmission shaft and a second hydraulic member disposed on the movable pulley half to define a hydraulic chamber with the first hydraulic member, wherein said first hydraulic member has a boss portion which is fitted and fixed to said transmission shaft, said boss portion being formed with a plurality of spring guide bores penetrating axially therethrough, said coil springs being accommodated in said spring guide bores and having fixed ends thereof supported by a pressing member which is secured to said transmission shaft, wherein said first hydraulic member is formed as a stationary piston and said second hydraulic member is formed as a hydraulic cylinder which accommodates therein said stationary piston, the hydraulic operating device being adapted to operate said movable pulley half by hydraulic pressure introduced into the hydraulic chamber; and a control valve for controlling supply of hydraulic pressure to the hydraulic operating device, wherein, a plurality of guide grooves are provided on an outer periphery of the transmission shaft for guiding said plurality of rows of ball keys, and said coil springs are disposed at positions between the guide grooves.

2. A V-pulley according to claim 1, wherein a through hole is formed in said first hydraulic member for providing communication between said hydraulic chamber and said control valve, said through hole being arranged between adjacent ones of said coil springs.

3. A V-pulley according to claims 1 or 2, wherein the V-pulley is a driven V-pulley.

4. A V-pulley according to claim 1, wherein a nut is screwed to said transmission shaft for securing said pressing member to the shaft and an engaging portion is provided in said transmission shaft for engagement by a detent tool.

5. A V-pulley according to claim 4, wherein, said boss portion of the first hydraulic member is rotatably supported by a bearing which is held in place by an annular shoulder formed on the boss portion and said nut.

6. A V-pulley according to claim 5, wherein the V-pulley is a driven V-pulley.

7. A V-pulley according to claim 4, wherein the V-pulley is a driven V-pulley.

8. A V-pulley according to claim 1, wherein the V-pulley is a driven V-pulley.

9. A V-pulley according to claim 1, wherein said coil springs are arranged around the transmission shaft substantially on a circumference on which the rows of ball keys are located.

10. A V-pulley for a belt type continuously variable transmission, comprising, a stationary pulley half for fixedly mounting on a transmission shaft, a movable pulley half for mounting on the transmission shaft, a plurality of rows of ball keys spaced circumferentially around and mating with grooves in said transmission shaft and movable pulley half for allowing relative axial movement and preventing relative rotational movement between said transmission shaft and movable pulley half and a plurality of axially extended coil springs circumferentially spaced and located circumferentially between said ball keys for resiliently urging said movable pulley half axially relative to said transmission shaft; a hydraulic operating device including a first hydraulic member fixedly mounted to the transmission shaft and a second hydraulic member disposed on the movable pulley half to define a hydraulic chamber with the first hydraulic member, the hydraulic operating device being adapted to operate said movable pulley half by hydraulic pressure introduced into the hydraulic chamber; and a control valve for controlling supply of hydraulic pressure to the hydraulic operating device, wherein, a plurality of guide grooves are provided on an outer periphery of the transmission shaft for guiding said plurality of rows of ball keys, and said coil springs are disposed at positions between the guide grooves.

* * * * *